United States Patent [19]

Brand

[11] Patent Number: 4,698,505

[45] Date of Patent: Oct. 6, 1987

[54] FINGER RING DOSIMETER

[75] Inventor: Hans-Norbert Brand, Munich, Fed. Rep. of Germany

[73] Assignee: Gesellschaft für Strahlen-und Umweltforschung m.b.H., Munich, Fed. Rep. of Germany

[21] Appl. No.: 844,621

[22] Filed: Mar. 27, 1986

[30] Foreign Application Priority Data

Apr. 4, 1985 [DE] Fed. Rep. of Germany ... 8510060[U]

[51] Int. Cl.$^4$ .......................... G01T 1/11; H05B 33/00
[52] U.S. Cl. ................................ 250/337; 250/472.1; 250/484.1
[58] Field of Search ............. 250/337, 390 SB, 472.1, 250/484.1, 485.1

[56] References Cited

U.S. PATENT DOCUMENTS 3,792,277  2/1974  Yamashita et al. ................ 250/337
3,878,108  4/1975  Burgkhardt et al. ............ 250/472.1
3,983,717  10/1976  Collica et al. .................... 250/484.1

Primary Examiner—Janice A. Howell

[57] ABSTRACT

A finger ring dosimeter wherein a clasp-like support structure bent to form an open ring has a cavity formed in its apex area and a radiation detecting thermoluminescent material is disposed in the cavity and, together with the support structure is encased and sealed into a coat of plastic material. Upon heating of the ring subsequent to its exposure to radiation, the detecting material emits light from the cavity which light is measured during an evaluation process as a measure of radiation exposure of the ring and its wearer.

7 Claims, 2 Drawing Figures

FINGER RING DOSIMETER

BACKGROUND OF THE INVENTION

The invention relates to a finger ring dosimeter which includes a thermoluminescent detector mounted in a ring formed as an open clasp.

For the measurement of ionizing photon radiation such as X rays, it is known to retain solid detecting members such as thermoluminescent glasses, alanines or other materials in various types of mountings which, however, will not permit analysis of the detecting member without its removal from the mounting. The detector mountings usually have profiled surface areas which make it difficult or impossible to fully remove dirt, bacteria or other contaminant deposits whichis particularly objectionable in an operating room area, for example. In addition, foreign matter might reach even the detector member since the detector member is not sufficiently protected. The use of dosimeters with such mountings under special measuring conditions, for example, in connection with a water phantom (a plexiglass container filled with water to simulate the human tissue), is therefore questionable.

It is also known that certain solid materials after irradiation will emit light when subjected to high temperatures and the quantity of the light emitted is utilized as a measure for the accumulated dosis. Present detector mountings however are not capable of resisting the temperature and at the same time providing for spectral light transparency. It is also known that a dosimeter needs to be adapted for its particular application, that is, a finger ring or person dosimeter must be assigned to the wearer and a local or environmental dosimeter must be assigned to a particular location. This is normally done by number assignments. Presently, the numbers are firmly associated with the support structure since they do not have the space for sufficiently large labeling with the exception of local dosimeters (with solid material dosimeter supports). Renewal of the markings of a dosimeter after an interval of usage including the evaluation procedure is not possible so that the properly assigned dosimeter has to be searched for when needed.

It is therefore the object of the present invention to improve the dosimeter handling efficiency by permitting the routine handling of particle dosimetry by way of single or multiple purpose dosimeters which requires a universally usable dosimeter mount for solid state detectors and a corresponding evaluation procedure.

SUMMARY OF THE INVENTION

This object is achieved by a finger ring dosimeter which consists of a clasp-like support structure bent to form an open ring having formed at its apex a cavity receiving a radiation detecting thermoluminescent material which, together with the support structure, is encased and sealed into a coat of plastic material.

Upon heating of the detecting material from one side of the cavity subsequent to a period of radiation exposure, the detecting material emits light which is measured from the other side in an evaluation process which determines the radiation exposure of the ring and its wearer.

Preferably a carbonized aluminum foil is disposed over the cavity on the outside of the clasp-like support structure which prevents exposure of the material to ultraviolet radiation but which may be easily heated from the outside by infrared radiation during the heating process and which conducts the heat to the thermoluminescent detector material for its heating while reflecting back out to the opposite side of the ring the light emitted from the detector material where the amount of light emission is determined as a measure of the radiation exposure.

It is a particular advantage that the dosimeter mounts for the solid state detectors are insertable into the clasp and the detector is embedded or molded together with a resiliently deformable interior reinforcement structure into a plastic material suitable for the given evaluation procedure. The finger ring dosimeter so prepared may of course also be used off a finger and in an environment which is aggressive for the detector as such; it can be easily identified by way of permanent or exchangeable identification markings and it may be evaluated by automatic operation while remaining in the mount. At the same time, the dosimeter is of small size and light weight, and it is easy to clean; it may be sterilized under cold or even hot conditions (hot only if the detector information may be erased); its contamination can be easily avoided because of smooth surfaces; it is resistant to liquids and various solutions and also to various temperatures; and it can be easily handled.

The dosimeter according to the invention is sufficiently temperature resistant that it may be heated from one side while, at the same time, it remains light transparent on the other such that the detector may be analyzed while remaining mounted.

SHORT DESCRIPTION OF THE DRAWINGS

FIG. 1 is a clasp dosimeter including a detector in cross-section, before it is bent into a finger ring; and FIG. 2 is a top view of the dosimeter clasp.

DESCRIPTION OF THE PREFERRED EMBODIMENT

Figure 1:
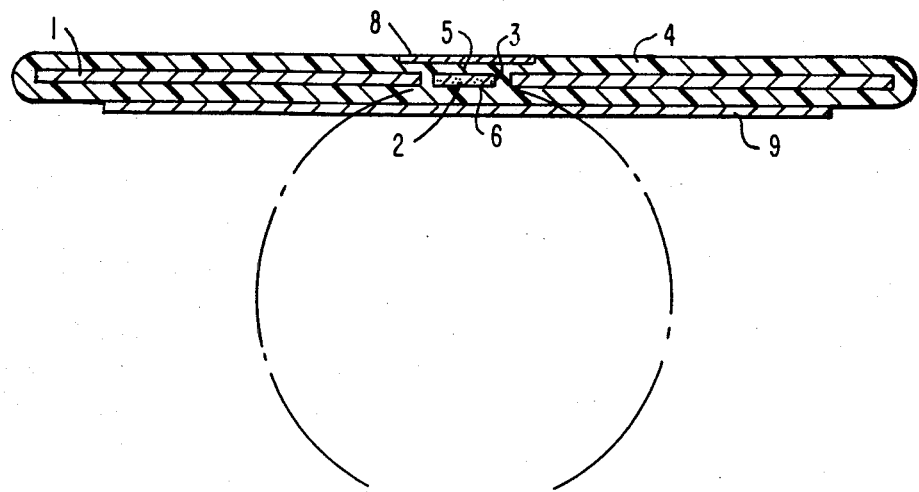
Figure 2:
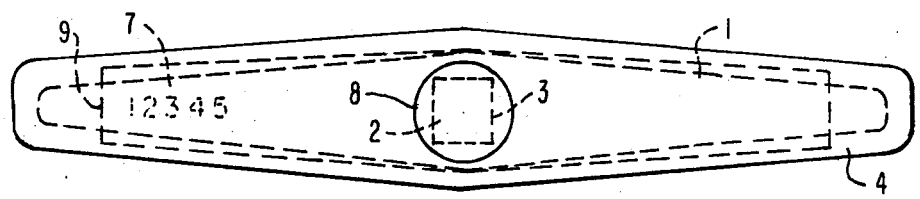

The finger ring dosimeter according to the invention consists essentially of a clasp 1 preferably of a thin elastic material which is shown flat in FIG. 1 before it is bent into a circular shape as indicated by the dash-dotted line. At its apex there is provided a pan-like cavity or rather a cut-out 3 receiving a detector 2. Its surface 5 is exposed to the radiation to be detected whereas its back side 6 serves to analyze the detector 2 (by thermoluminescent light emission). The clasp 1 including the detector 2 is surrounded by a homogeneous thin coat 4 of plastic which provides for a complete coating. As seen in FIG. 2 an identification code 7 may be provided on the top surface of the clasp 1.

As a result, the detector 2 together with the reinforcement structure which serves as the clasp 1 is fully embedded and hermetically enclosed. The coat 4 consists of plastic materials which, at least at the heat-supply side 5, are temperature resistant up to about 400° C. depending on the requirements of the detector material utilized and which, on the evaluation side 6, provide for the necessary light transparency. The bendable reinforcement structure, that is, the clasp 1, may consist, for example, of a thin steel spring or of a relatively stiff alloy member which permit adjustment of the ring opening to the finger size of the wearer. The detector material 2 is arranged in a cavity 3 in the apex area of the clasp 1.

The shape of the strap, that is, the clasp 1 and the coat 4, is such that there is about the same resistance to bending over the clasp length so as to facilitate the bending into a ring and to avoid cracks. If thermoluminescent material is used as the detector 2, either as powder, as a chip or as a thin film, an aluminum foil 8, which has its one side, that is, the side facing the heat supply side 5, carbonized, is disposed over the cavity 3 and cemented in place or simply enclosed in the coat 4 in order to prevent ultraviolet radiation exposure of the detector 2. However, if the area over the cavity 3 is blackened, no such carbonized aluminum foil is needed.

The carbonization of such aluminum foil also serves to improve heat absorption during the evaluation procedure. The smooth bright underside of the foil adjacent the detector material serves as a light reflector.

It is also possible to arrange more than one detector element side-by-side in the cavity 3 so that:

1. different thermoluminescent materials (LiF:Mn; BeO:Na) may be used at the same time.
2. for example, carbonized Cu foils of different thickness may be used in connection with a corresponding amount of different detectors in order to permit filter-analytical evaluation of the radiation dosis.

Also, an adhesive Al foil 9 may be disposed at the underside of the arrangement which foil 9 is provided with an identification code 7.

A loss of the detector material by breakage of the clasp during use or during evaluation is impossible since the detector material is embedded and fully enclosed. This also prevents any loss of information during the evaluation procedure. Cleaning of the dosimeters and also their sterilization under cold or, to certain limits, hot conditions are simple and unproblematic because of the type of plastic materials used which plastic materials are resistant to aggressive substances and resistant to high temperatures and because the surfaces are perfectly smooth. The dosimeter may be evaluated as to radiation exposure with the detector remaining in the support structure. The design is such that, with an inexpensive detector material such as BeO:Na, the dosimeter may be discarded after use and evaluation.

In a dosimeter with blackened Al foil cover, for example, heat may be applied by radiation to the foil and conducted to the thermoluminescent material which, upon being heated, produces light which, directly and reflected from the Al foil, is emitted through the translucent opening of the ring clasp where the light emission is determined as a measure of radiation exposure of the dosimeter and its wearer.

I claim:

1. A finger ring dosimeter comprising a clasp-like support structure formed as an open ring and having a central apex area, said support structure consisting of a thin elastic material which permits bending to adapt to a finger diameter as needed and having a cavity formed in said apex area, a radiation detecting material disposed in said cavity, and a carbonized foil disposed above said cavity on the side of said support structure remote from a wearer's finger, said clasp-like support structure and said radiation detecting material and said carbonized foil being embedded and hermetically enclosed in a coat of plastic material.

2. A finger ring dosimeter according to claim 1, wherein said detecting material is present in said cavity in the form of a powder.

3. A finger ring dosimeter according to claim 1, wherein said detecting material is present in said cavity as a chip.

4. A finger ring dosimeter according to claim 1, wherein said detecting material consists of a thin film deposited in said cavity.

5. A finger ring dosimeter according to claim 1, wherein said cavity is a cut-out in said support structure and said radiation detecting material is disposed in said cut-out.

6. A finger ring dosimeter according to claim 1, wherein said carbonized foil consists of aluminum.

7. A finger ring dosimeter according to claim 1, wherein said radiation detecting material is a thermoluminescent material adapted to emit, upon heating, an amount of light corresponding to its radiation exposure, said carbonized foil being adapted to receive heat energy and conduct it to said thermoluminescent material from the outside of said ring and said thermoluminescent material, upon heating, being adapted to generate light which, directly and reflected from said aluminum foil, is emitted through said cavity to the inside of said ring for evaluation thereof as an indicator of the radiation exposure of said ring and its wearer.

* * * * *